(12) United States Patent
Dumant et al.

(10) Patent No.: US 10,540,400 B2
(45) Date of Patent: Jan. 21, 2020

(54) PROVIDING SUGGESTIONS BASED ON USER CONTEXT WHILE EXPLORING A DATASET

(71) Applicant: Business Objects Software, Ltd., Dublin (IE)

(72) Inventors: Bruno Dumant, Verneuil sur Seine (FR); Yann Le Biannic, Suresnes (FR); Olivier Hamon, Levallois Perret (FR)

(73) Assignee: Business Objects Software, Ltd., Dublin (IE)

( * ) Notice: Subject to any disclaimer, the term of this patent is extended or adjusted under 35 U.S.C. 154(b) by 737 days.

(21) Appl. No.: 14/856,979

(22) Filed: Sep. 17, 2015

(65) Prior Publication Data
US 2016/0371395 A1   Dec. 22, 2016

Related U.S. Application Data

(60) Provisional application No. 62/180,277, filed on Jun. 16, 2015, provisional application No. 62/180,280, filed on Jun. 16, 2015.

(51) Int. Cl.
*G06F 16/9032* (2019.01)
*G06F 16/2457* (2019.01)
*G06F 16/9038* (2019.01)

(52) U.S. Cl.
CPC .. *G06F 16/90328* (2019.01); *G06F 16/24575* (2019.01); *G06F 16/24578* (2019.01); *G06F 16/9038* (2019.01); *G06F 16/90324* (2019.01)

(58) Field of Classification Search
None
See application file for complete search history.

(56) References Cited

U.S. PATENT DOCUMENTS

| | | | |
|---|---|---|---|
| 5,485,564 A | 1/1996 | Miura et al. | |
| 6,587,102 B2 | 7/2003 | Taylor et al. | |
| 6,859,937 B1 | 2/2005 | Narayan et al. | |
| 7,603,349 B1 * | 10/2009 | Kraft | G06Q 10/10 |
| 8,898,140 B2 | 11/2014 | Cooper et al. | |
| 2009/0043749 A1 | 2/2009 | Garg et al. | |
| 2010/0211588 A1 | 8/2010 | Jiang et al. | |
| 2011/0035403 A1 | 2/2011 | Ismalon | |

(Continued)

*Primary Examiner* — James Trujillo
*Assistant Examiner* — John J Morris
(74) *Attorney, Agent, or Firm* — Mintz Levin Cohn Ferris Glovsky and Popeo, P.C.

(57) ABSTRACT

A computer-implemented method for generating a plurality of data query suggestions is described. The method includes receiving a textual input in a user interface of a software application implementing a plurality of business processes and determining a query context for the textual input. The method also includes computing a plurality of ranked numerical scores based on the query context in which the ranked numerical scores are computed using information obtained from a plurality of usage metrics associated with the query context and determining, using the plurality of ranked numerical scores, a plurality of candidate data combinations. The method also includes ordering the plurality of candidate data combinations according to the plurality of ranked numerical scores and generating at least one data suggestion using the ordered plurality of candidate data combinations and providing the at least one data suggestion in the user interface.

20 Claims, 10 Drawing Sheets

(56) References Cited

U.S. PATENT DOCUMENTS

| | | | | |
|---|---|---|---|---|
| 2012/0130978 A1* | 5/2012 | Li | ................ | G06F 16/90324 |
| | | | | 707/706 |
| 2012/0191745 A1* | 7/2012 | Velipasaoglu | ...... | G06F 16/3322 |
| | | | | 707/767 |
| 2016/0063093 A1* | 3/2016 | Boucher | ............ | G06F 17/3064 |
| | | | | 707/748 |

* cited by examiner

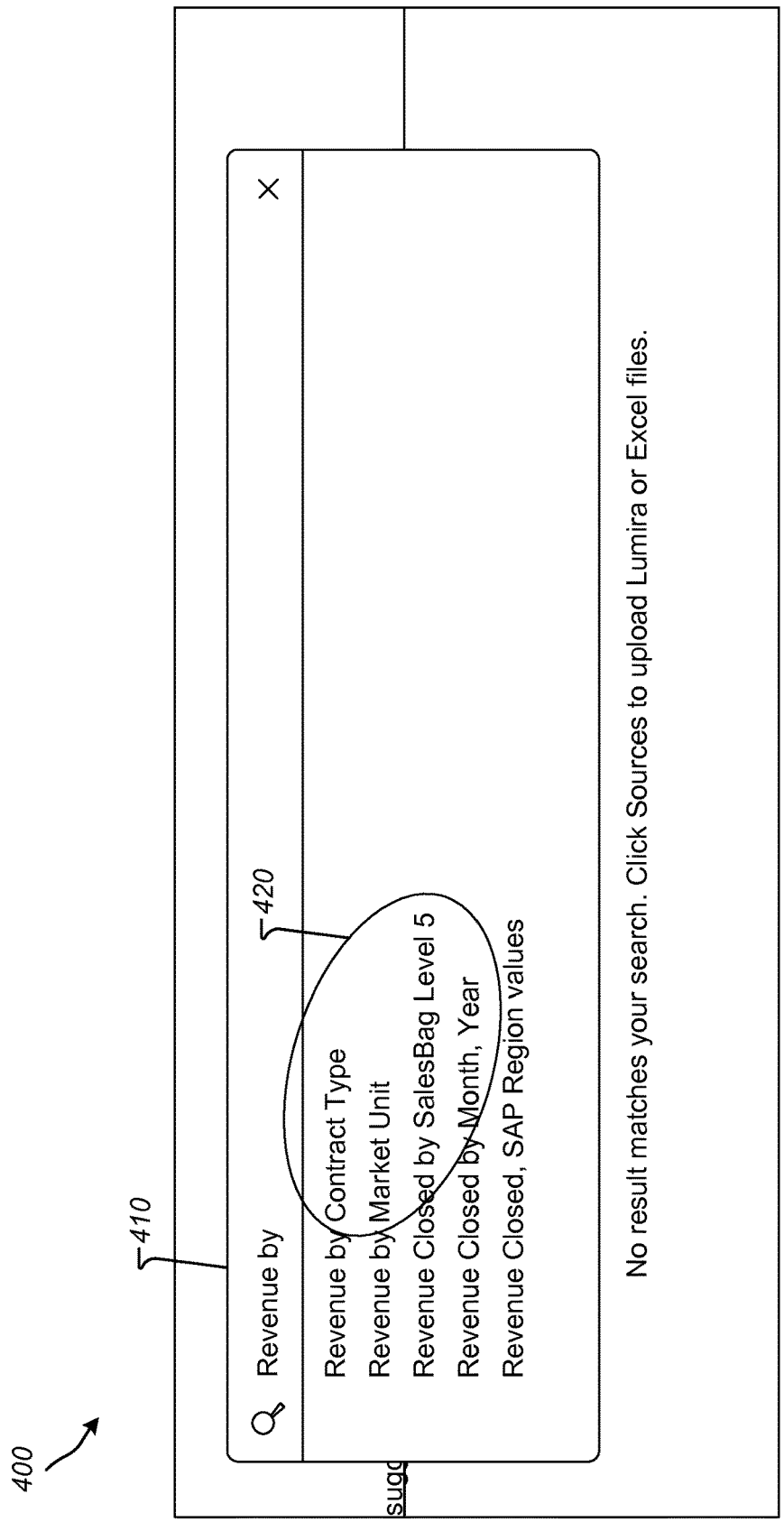

PROVIDING SUGGESTIONS BASED ON USER CONTEXT WHILE EXPLORING A DATASET

CROSS REFERENCE TO RELATED APPLICATION

This application claims the benefit of U.S. Provisional Application Nos. 62/180,277 and 62/180,280, both filed on Jun. 16, 2015, the entire contents of which are incorporated by reference in their entirety.

TECHNICAL FIELD

This description relates to using user-context information, such as usage information, to suggest next steps (e.g., to a user) during the exploration of a dataset.

BACKGROUND

A typical organization, such as a business enterprise collects large amounts of data. In such a situation, sophisticated data solutions are in demand in order to quickly and accurately access data desired by users from massive amounts of data managed by the business enterprise.

SUMMARY

According to one general aspect, a computer-implemented method for generating a plurality of data query suggestions is described. The method includes receiving, from a user, a textual input in a user interface of a software application implementing a plurality of business processes and determining a query context for the textual input. The query context may be determined from the textual input, characteristics of the user, and data that the user is viewing in the software application. The method also includes computing a plurality of ranked numerical scores based on the query context in which the ranked numerical scores are computed using information obtained from a plurality of usage metrics associated with the query context. The method additionally includes determining, using the plurality of ranked numerical scores, a plurality of candidate data combinations. The data combinations include a plurality of dimensions and measures compatible with the query context. The method also includes ordering the plurality of candidate data combinations according to the plurality of ranked numerical scores and generating at least one data suggestion using the ordered plurality of candidate data combinations and providing the at least one data suggestion in the user interface.

One or more implementations may include the following features. For example, determining the plurality of candidate data combinations includes modifying the query context by performing actions using a dataset associated with the query context, the actions selected from the group consisting of substituting one dimension for another dimension, adding a dimension, adding a measure, and adding a filter. As another example, the plurality of ranked numerical scores are used to recommend one or more graphic data visualizations corresponding to the at least one data suggestion.

One or more implementations may include determining a query context associated with the user and data that the user is viewing in the software application. The determining includes accessing a profile of the user, extracting information from the profile of the user, selecting a subset of the plurality of usage metrics based on the extracted information, and calculating the ranked numerical scores using the subset of usage metrics.

One or more implementations may include the following features. A usage metric of the plurality of usage metrics is a weighted usage metric and a weighting of the weighted usage metric corresponds with the user. In some implementations, a usage metric of the plurality of usage metrics is attributable to a plurality of users. In some implementations, the plurality of usage metrics includes a plurality of element usage metrics and at least one element pair usage metric. In some examples, a value of a usage metric of the plurality of usage metrics is exponentially decreased over time.

In some implementations, the method further includes incrementing one or more usage metrics of the plurality of usage metrics in correspondence with the textual input. Incrementing one or more usage metrics includes incrementing one or more usage statistics using a weight corresponding with the user. In some implementations, the plurality of ranked numerical scores include a plurality of conditional probabilities. In one example, the plurality of ranked numerical scores include a plurality of normalized averages.

According to another general aspect, a system for building a query for execution on one or more datasets included in a database includes a client computing device implementing a user interface of a software application implementing a plurality of business processes, the user interface being configured to receive, from a user, a textual input and a suggest query service. The suggestion query service is configured to determine a query context for the textual input, the query context being determined from the textual input, characteristics of the user, and data that the user is viewing in the software application, compute a plurality of ranked numerical scores based on the query context, the ranked numerical scores being computed using information obtained from a plurality of usage metrics associated with the query context, determine, using the plurality of ranked numerical scores, a plurality of candidate query suggestions, the query suggestions including a plurality of dimensions and measures compatible with the query context, order the plurality of candidate query suggestions according to the plurality of ranked numerical scores, and generate at least one query suggestion using the ordered plurality of candidate query suggestions and providing the at least one query suggestion in the user interface.

One or more implementations may include the following features. The suggest query service is included in an enterprise software application and is further configured to increment one or more usage metrics of the plurality of usage metrics in correspondence with the textual input. In some implementations, determining a query context associated with the user and data that the user is viewing in the software application includes accessing a profile of the user, extracting information from the profile of the user, selecting a subset of the plurality of usage metrics based on the extracted information, and calculating the ranked numerical scores using the subset of usage metrics.

According to another general aspect, a computer program product may be tangibly embodied on a computer-readable medium and may include executable code that, when executed, is configured to cause at least one data processing apparatus to perform the following operations. Specifically, the executable code may cause receiving, from a user, a textual input in a user interface of a software application implementing a plurality of business processes and determining a query context for the textual input. The query context may be determined from the textual input, characteristics of the user, and data that the user is viewing in the software application. The executable code also computes a plurality of ranked numerical scores based on the query context in which the ranked numerical scores are computed using information obtained from a plurality of usage metrics associated with the query context. The executable code also additionally determines, using the plurality of ranked numerical scores, a plurality of candidate data combinations. The data combinations include a plurality of dimensions and measures compatible with the query context. The executable code also orders the plurality of candidate data combinations according to the plurality of ranked numerical scores and generating at least one data suggestion using the ordered plurality of candidate data combinations and providing the at least one data suggestion in the user interface.

The details of one or more implementations are set forth in the accompanying drawings and the description below. Other features will be apparent from the description and drawings, and from the claims.

BRIEF DESCRIPTION OF THE DRAWINGS

FIGS. 4A and 4B are screenshots illustrating an example of query completion suggestions.

DETAILED DESCRIPTION

Figure 1:
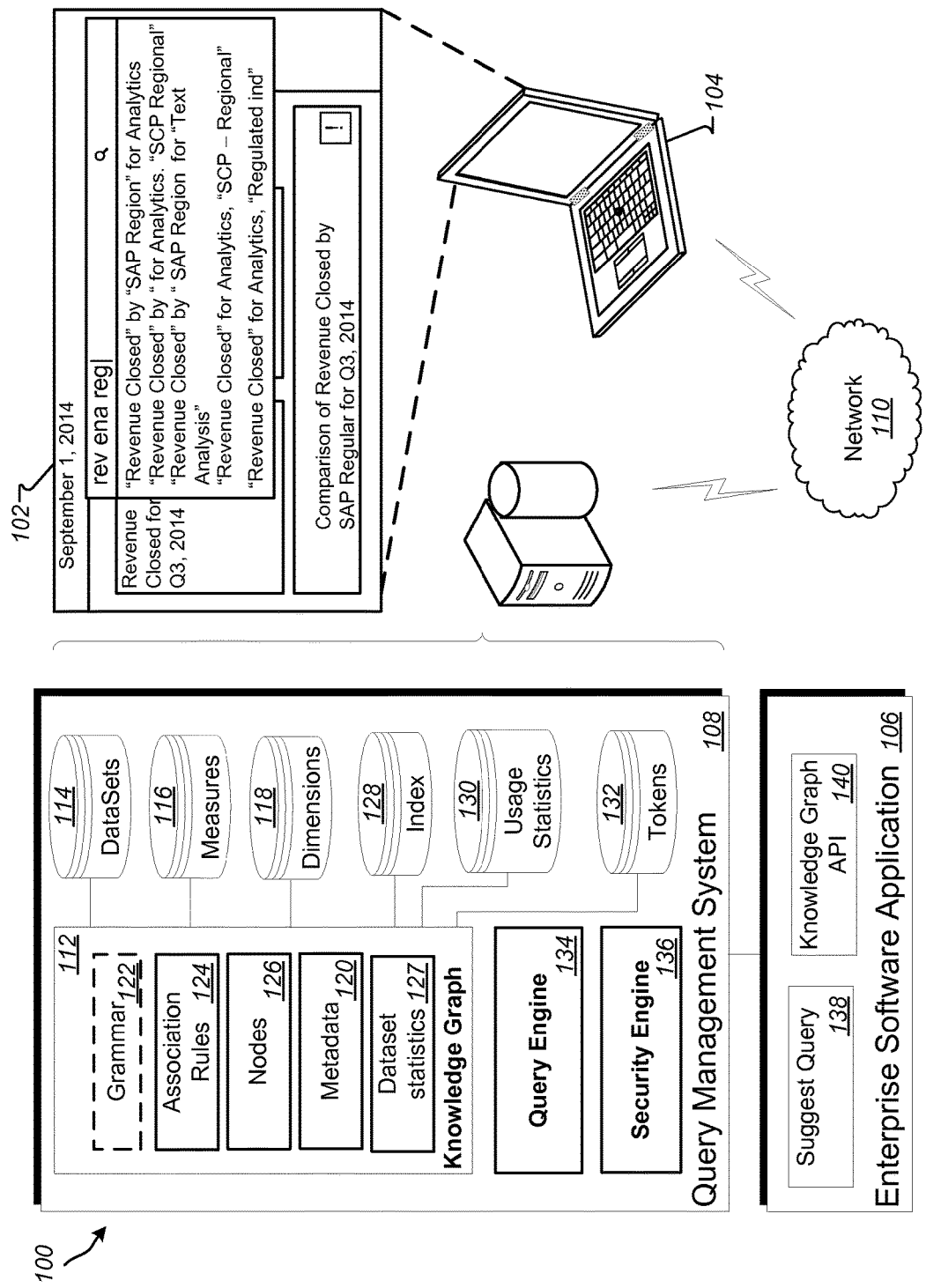
FIG. 1 is a block diagram of a system for generating and providing query suggestions and completions in a user interface associated with business software executing at a client device.

Performing online analytical processing on datasets (e.g., data contained in database tables) with tens or hundreds of data dimensions and/or measures can be a complex task. The systems and methods described in this disclosure can be used to perform online analytical processing of data by using a number of data usage metrics, which can also be referred to as usage statistics, to operate on sets of data with a view focused on a current context (e.g., a context that is relevant at a specific user at a given point in time).

A current context can be referred to as a user-context. A user-context (such as described herein), in combination with such usage metrics, can be used to make data analysis (e.g., data query) suggestions to a given (current) user. Such suggestions can include particular dimensions, measures, and filters to use to view data included in one or more datasets being accessed. That is, a current user-context can be used to determine relevant data (e.g., via providing search query suggestions) for presentation to a specific (current) user. Said another way, the disclosed techniques and approaches can be implemented to provide data analysis (e.g., query) suggestions for data included in one or more datasets (database tables) that are determined to be relevant to a current user-context corresponding with a given user.

In an implementation, a user-context for a particular user may be defined by a number of attributes, such as a user identifier (e.g., used by the user to access or login to a data analysis system), the user's job function, business groups and/or hierarchies the user is associated with, textual input received from the user (e.g., a user question about data in or more dataset in a database), and/or previously executed or edited queries, as some examples. Usage metrics corresponding with use of one or more datasets can be collected over time and stored in a corresponding data analysis system, such as a database system. For instance, usage metrics can be stored in a database table (e.g., a relational database table), in a knowledge graph, such as the knowledge graph described herein, or in any appropriate fashion for a given implementation.

The systems and methods described in this disclosure can be used to provide suggestions to a user for building a query that is relevant to a current user-context. In an implementation, a user-context can also be based on a combination of dimensions, measures, and filters that can be used to obtain views of data (e.g., based on information entered by a given user). The systems and methods described herein can be configured to identify one or more possible (suggested) modifications to a user entered query (e.g., a user question) based on the determined user-context in order to provide relevant search query suggestions and search results. Such search query suggestions can include switching to a different dimension, suggesting an additional dimension, suggesting an additional measure, and/or suggesting addition or removal of a data filter.

In some implementations, the systems and methods described herein can adapt online analytical processing visualizations (e.g., graphics, combined data structures, metric charts, etc.) to provide one or more graphical representations that a user can review to determine patterns identified using usage metrics and a current user-context. Such visualizations may be provided to explain data suggestions and/or contexts.

In some implementations, the online analytical processing techniques described herein can allow a user (e.g., human analyst) to navigate through a number of successive perspectives on views of data included in one or more datasets that are relevant to a determined user-context. Such navigation/exploration can include reducing a number of dimensions (e.g., consolidating, rolling up), adding additional dimensions (e.g., drill down), and/or applying filters (e.g., slice and dice) to the data. The disclosed techniques can allow an interactive and iterative process of information discovery (e.g., query building) that is driven by a user providing a particular context (e.g., entering a question about data included in one or more available datasets) and/or a user-context determined by a corresponding data analysis system.

In some implementations, the techniques described herein can be used to identify structures and patterns in data, and display such structures and patterns to a user (e.g., as suggestions). The user can then use such suggestions to perform additional operations on data in datasets determined to be relevant. Such operations may include preparing data, or cleansing data (e.g., to ensure the data is suitable to be processed by one or more corresponding analytical processing techniques or algorithms). These operations may also include selecting relevant algorithms to produce data models depicting data patterns. The operations may additionally include evaluating models to assess accuracy and applicability to similar and/or other data.

Identified patterns and exceptions to such patterns can, in addition to making suggestions based on user metrics, be scored based on a number of system-identified statistics. Such statistics may pertain to the information each pattern may provide to a user. Suggested query completions and/or recommended data visualizations can be based on usage metrics alone, or in combination with dataset statistics and/or system rules (such as those described herein).

In some implementations, the systems and methods described in this disclosure can perform compatibility determinations and provide relevant data without burdening the user with the analysis of comparing data, data fields, data attributes, data categories, etc. In short, the systems and methods described in this disclosure can provide relevant query strings (e.g., that are built, at least in part, from contextualized suggestions) to obtain relevant search results (contextually relevant data) based on usage information (usage statistics or usage metrics), dataset statistics and/or system rules associated with a particular user-context (e.g., including characteristics of a current user, entered query terms, etc.).

Referring to FIG. 1, a block diagram of a system 100 is shown. The system 100 may be configured to provide a user interface 102 associated with business software executing at a client device 104. The client device 104 can display the user interface 102, which may be provided by an enterprise software application 106 and/or query management system 108, each executing on one or more server devices and connectable through a network 110.

The example user interface 102 shown here includes a business application accessing or running enterprise software application 106 and/or requesting data via query management system 108. The user can access user interface 102 to obtain business data regarding business objects in the enterprise software application 106. Textual and graphical content displayed in user interface 102 may include business data associated with a number of datasets, measures, and dimensions, each of which can be associated with a knowledge graph 112 of the system 100. In other implementations, data being accessed can be organized in other ways.

The enterprise software application 106 can include one or more datasets (e.g., data organized in database tables), which users can access to generate views of data included in the one or more datasets. In the approaches described herein, a user-context can be used to determine which datasets (or data within a given dataset) may be relevant to that user-context. In other words, a user-context can be used to select a subset of datasets or data from a collection of datasets included in, or associated with the enterprise software application 106. For instance, a current user-context can be used to identify measures, dimensions and/or data filters that may be relevant to information a user is searching for in the datasets of the enterprise software application 106.

Measures can represent data objects that include metrics such as sales revenue, salary, inventory stock, or number of employees, etc. In some implementations, the measures can include a plurality of data objects that quantitatively define at least one attribute within a number of datasets. Measures provided in the user interface 102 for selection (suggested measures) when formulating a query can be determined based on the current user-context, such as using the approaches described herein. In some implementations, a user can select several measures to be included in data presented in interface 102. However, selecting one or more measures can affect other data presented in interface 102. In some implementations, measures may be stored and accessed from a measures repository 116. In other implementations, the measures repository can be included in a knowledge graph, such as the knowledge graph 112 of FIG. 1.

Dimensions can represent data objects that include categorical data in a dataset. Example dimensions may include categories such as products, regions, or time. In some implementations, the dimensions may define a plurality of data categories for attributes in a number of datasets. In general, suggested dimensions can include two selection modes. The first selection mode can cause the dimension to be used as an axis of data visualization graph (e.g., by country). The second selection mode can cause the dimension to be used as a filter (e.g., for Q3/2014 as Quarter/Year). For example, selecting a dimension can cause an axis or value to be modified within data depicted in interface 102. In this fashion, selecting dimensions can function to filter data. In the example implementation of FIG. 1, dimensions may be stored and accessed from a dimensions repository 118.

The example system 100 also includes the knowledge graph 112. The knowledge graph 112 may represent a hierarchically arranged platform, which can be used to manage business data. This platform can be configured to organize and distribute business data for a particular organization. The knowledge graph 112 can function as a repository to be used to structure, simplify, and connect business data to users accessing such data. The data in the knowledge graph 112 may be aggregated from a variety of internal and external sources. In some implementations, the knowledge graph 112 can include metadata 120 that defines a path to obtain a document that may be relevant (or responsive), e.g., based on a current user-context, to a particular search query. In this example, rather than store the data in the knowledge graph 112, the information for accessing the data is stored in the knowledge graph 112.

The knowledge graph 112 can access, or provide access to a number of repositories including, but not limited to datasets repository 114, measures repository 116, dimensions repository 118, metadata 120 and usage statistics 130, which can be stored internal to the graph 112, external to the graph 112, or a combination of both. In general, the knowledge graph 112 may be implemented using any suitable software constructs.

Nodes of the knowledge graph 112 may represent business objects that have associated functions and variables. In some implementations, data contained in the knowledge graph 112 can be constructed of edges and nodes and can be stored in any suitable number of data repositories across one or more servers that are located in one or more geographic locations and coupled by any suitable network architecture. As used herein, a business object refers generally to a construct of data and a methodology regarding how to interact with the data. The knowledge graph 112 can include business object data, metadata, and associating data for such business objects.

The metadata 120 can include data associated with one or more datasets, measures, and/or dimensions. The metadata 120 may describe semantic enhancements or enrichments to the datasets, measures, and/or dimensions. For example, a dataset can contain metadata that defines time and geography hierarchies, measures, formulas, and calculations, just to name a few examples.

The system 100 can also include a set of association rules 124 (or other rules) that can be used to verify business intelligence semantics stored in the knowledge graph 112. In one example, rules in the association rules 124 (which may also be referred to as system rules, rules, and so forth) can be used to determine how each element of a search query can be connected to other elements (whether included in the query or not) using a specific set of relation types. Relation types can include parent nodes, child nodes, similar nodes based on keywords, business object overlap, business unit overlap, usage history included in usage statistics, dataset statistics 127, etc.

The association rules 124 can be used to determine a path through the knowledge graph 112 to connect each element of a search query, e.g., to ensure that the system 100 finds and joins conditions that can be performed to execute the query. An example rule may include specific terms or keywords. For instance, the keyword "current" may be associated with a rule in a system grammar that states that "current" should be followed by an attribute with a time semantic (e.g., "current year" translates to "2015," or the actual current year). In some implementations, the system grammar can be used to detect intent and modify particular visualizations and/or query suggestions in the user interface 102. For example, a rule can be defined in the association rules 124 for the keyword combination "comparison of" This keyword combination can be associated with a rule that ensures at least two measures are used so that the query management system 108 can generate a bar graph/chart. Another rule may include specifying a drill path or a drill order used to follow a defined hierarchy order (e.g., by year, then by month, etc.).

In the example system 100, the query management system 108 also includes a query engine 134 and a security engine 136. In some implementations, the query engine 134 and/or the security engine 136 may be provided external to query management system 108.

In the system 100, a query, before being executed by query engine 134, can be constructed (built) by a suggest query service 138 of the enterprise software application 106, where syntax of the query can be built using suggestions based on a user-context that is defined, at least in part, by input entered by a user in the user interface 102. For example, in the system 100, query objects can be generated in near real time by the query suggest service 138. The generated query objects can then be transformed to a machine-readable format by the query suggest service 138, sent to the query management system 108 and executed by the query engine 134 to retrieve information from the datasets 114, for example. The retrieved information can be used to build answers (e.g., views or visualization of data in datasets) to a particular query. A generated query can be executed against business intelligence data models (e.g., view, dataset, documents, etc.), with the answer to a query being displayed as a visualization of data in the user interface 102.

Accordingly, in the system 100, the suggest query service 138 can be configured to build query strings and the query engine 134 can be configured to execute queries based on the query strings generated (built) by the suggest query service 138. In an implementation, as noted above, the suggest query service 138 can build a query based on data provided in user interface 102, for example. The data provided in user interface 102 may be system-generated, user-entered, or a combination of both. In some implementations, the suggest query service 138 can be configured to determine a query context associated with data entered into the user interface 102 (or with respect to data presented in interface 102).

Determining a query context can include using a combination of user entered data and data sources to ascertain a current user-context from the user entered data. For example, one way to determine the query context can include accessing the knowledge graph 112 to compare the selected and displayed data from user interface 102 with data (e.g., nodes and edges) in the knowledge graph 112. The comparison can include determining associations between information stored in the knowledge graph and determining which of those associations are compatible with (related to, relevant to, etc.) the data displayed in user interface 102.

In operation, the query suggest service 138 may be configured to generate a number of keyword search queries using one or more keyword tokens that may be generated by receiving user input, such as a free text query or question in a search field. The suggest query service 138 can execute the keyword searches against a metadata repository and obtain search results relevant to the one or more keyword searches. It can also execute the keyword searches against index 128 and obtain other search results relevant to the one or more keyword searches. Using the search results, the query suggest service 138 can generate a list of query suggestions. The query suggestions can be then be provided to the user by the suggest query service 138 for selection. Selection of a query suggestion can then trigger execution of a system-wide search for related or relevant business data.

The security engine 136 can be configured to determine whether a user accessing user interface 102 (and thereby accessing content in query management system 108 and enterprise software application 106) is authorized to access particular data. For example, the security engine 136 can determine whether insufficient security permissions have been provided for a user of the software application. If the security engine 136 determines that particular data cannot be accessed, the user interface 102 can be modified to exclude that data. That is, the security engine 136 can remove data from the interface 102 and/or terminate (or prevent) view access to certain datasets, measures, dimensions, or any associated business objects.

In some implementations, the security engine 136 may be configured to implement security rules to allow or deny presentation of query suggestions to a user of the user interface, the security rules being based on enterprise policies, data owner choices, etc. In some implementations, the security engine 136 may be configured to deny access to one or more query suggestions by removing the one or more query suggestions from a list of generated query suggestions before providing the list to a user. Such denied access may occur because the security engine 136 determined that insufficient user permissions are associated with the user accessing the user interface 102 of the enterprise software application 106.

In some implementations, the security engine 136 can access information provided by entities wishing to access the query management system 108. For example, such information can include security model information, metadata describing sources of such information, and access control list data to be indexed in index repository 128, for example. In addition, the actual access control lists can also be indexed. For example, the query engine 134 can perform a search query according to user credential rules that allow secure access to a portion of repositories within an organization. The user credential rules may block particular repositories from being searched by the query engine 134 (via application/user interface 102) based on a given user's access privileges.

In some implementations, the security engine 136 can be configured to determine an identity of a user accessing user interface 102 to determine historical usage metrics 130 associated with the enterprise software application 106, or query management system 108. The usage metrics (statistics) 130 may pertain to historical data access, previously suggested queries, previously user-edited queries and/or a present query combined with the identification of the user. Determining user identification can include retrieving data about the user from login credentials or other repositories storing user data. The retrieved data can be used to obtain the user's job title, management statistics, security groups, hierarchy within a group, etc.

Referring again to FIG. 1, the query management system 108 can include (or have access to) enterprise software application 106. The enterprise software application 106 represents computer software used to satisfy the needs of a business organization. Enterprise software application 106 can generally include a collection of computer programs (e.g., software applications and repositories) with common business applications, tools for modeling how an organization functions, and development tools for building applications unique to the organization. The enterprise software application 106 can be used in combination with query management system 108 to improve enterprise productivity and efficiency by providing business logic support functionality and contextual query resolution.

Services provided by the enterprise software application 106 may include business-oriented tools such as query context management and search query management. Other services are possible including, but not limited to, online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The enterprise software application 106 shown here, as discussed above, includes a suggest query service 138 and a knowledge graph (application program interface) API service 140. Both services 138 and 140 can be configured to manipulate user interfaces (such as user interface 102) using stored data from query management system 108. In particular, the suggest query service 138 can transform a user entered query or question (suggested, or otherwise) into query descriptions over existing datasets and artifacts in enterprise software application 106 and/or query management system 108. An associated query service 134 can function to retrieve data corresponding to the suggested query and used to provide visualizations of the data to a user. A visualization recommendation service (not shown) can be used to determine how a suggested query could be properly visualized in a user interface. The suggested queries may be based on information stored in the knowledge graph 112. The knowledge graph 112 may be built from information that can be crawled from various data sources, or derived from usage.

The knowledge graph API service 140 can be provided to a number of entities that wish to utilize query management system 108 and enterprise software application 106. Entities can push information to the knowledge graph 112 by sending information on a message bus. For example, to insert data into the knowledge graph 112, entities can send security model information, metadata describing the sources of information to be indexed, as well as access controls lists. In some implementations, the entities (e.g., source systems) may decide which information should be sent, and to what extent dimensions can be indexed. Information sent over the bus can be collected by dedicated collectors (not shown) that can store such information in the knowledge graph 112. The collectors may be deployable independently of one another to make scaling and graph updating convenient.

The query management system 108 in system 100 can be communicatively coupled to client device 104. Client device 104 can access query management system 108 and any associated software applications. Client device 104 can be connected (wired or wirelessly) to system 108, which can provide business data, user interfaces, and facets for display. In some implementations, the client device 104 can execute one or more applications on the query management system 108 and provide business content and/or services to client device 104.

In some implementations, one or more additional content servers and one or more computer-readable storage devices can communicate with the client device 104 and query management system 108 using network 110 to provide business data content to the devices hosting client device 104 and query management system 108. In some implementations, the network 110 can be a public communications network (e.g., the Internet, cellular data network, dialup modems over a telephone network) or a private communications network (e.g., private LAN, leased lines). In some implementations, the client device 104 and query management system 108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Although only two computing devices are depicted in FIG. 1, the example system 100 may include additional computing devices (or a single computing device) that can exchange data over network 110 and/or additional networks (not shown). The computing devices hosting query management system 108 and enterprise software application 106 may represent clients or servers and can communicate via network 110, or other network. Example client devices may include a mobile device, an electronic tablet, a laptop, or other such electronic device that may be used to access business content from query management system 108. Each client device can include one or more processors and one or more memory devices. The client devices can execute a client operating system and one or more client applications that can access, control, and/or display business data on a display device included in each respective device. The query management system 108 may represent a server device. In general, the query management system 108 may include any number of repositories storing content and/or business software modules that can search, generate, modify (e.g., edit), or execute business software and associated business objects, data, and knowledge graphs.

Additional devices are possible and such devices may be configured to be substituted for one another. In some implementations, a client device 104 and the query management system 108 can be laptop or desktop computers, smartphones, personal digital assistants, portable media players, tablet computers, gaming devices, or other appropriate computing devices that can communicate, using the network 110, with other computing devices or computer systems.

In operation of system 100, a user can pose a query/question in interface 102 and receive one or more answers in the form of raw data, visual/graphical data, and/or other data format. The answers can be provided by query management system 108. In a non-limiting example, the query management system 108, in conjunction with the enterprise software application 106, can build and execute a set of consistent queries using rich business intelligence semantic information, syntactic keyword rules, combination rules, security rules, dataset statistics and/or usage statistics and can do so with near real time performance.

In short, the query management system 108 can receive textual data from a user accessing interface 102. The query management system 108 and the enterprise software application 106 can use the grammar 122 and the received data to generate a set of consistent (relevant) queries. The text in the user entered data can be analyzed and tokenized (i.e., portioned into tokens), and associated to keywords if a matching textual query portion can be found in the grammar 122. In some implementations, the matching can be performed using a Levenshtein distance algorithm to resist accounting for typing errors. Other approximating algorithms can, of course, be substituted. The query management system 108 can attempt to match each token (including keywords) against the metadata using a full text search engine or an external search engine. It can also attempt to match each token (including keywords) against the data stored in index 128 using a full text search engine or any suitable search engine. The matches can be combined using predefined association rules (e.g., association rules 124) as a default. In some implementations, the rules may include particular rules associated with the received/detected keywords. Combining the matches can include generating a tree/graph in which nodes 126 of the graph 112 represent matched data, metadata or keywords item, (or a node to mark a non-matched item). A new node can be added as a child node if an existing node satisfies the applied rules.

Upon applying the rules, the query management system 108 and the enterprise software application 106 (e.g., the suggest query service 138) can select a number of generated query suggestions that appear to be within the same context as, and relevant to the user entered textual data. The selection of generated query suggestions can be accomplished by analyzing a number of scores for the generated suggestions, such as text search scores (e.g., how close are the tokens to actual data or metadata), grammar scores, rule-based scores, usage metric based scores, dataset statistics scores, and so forth. That is, such scores can be used as an indication (a relative indication) of the relevance of each suggestion.

The selected query suggestions can then be translated to a human readable format and translated to a query term that can be accessed by the suggest query service 138, for example. The translation can be performed using the grammar keywords to express the interpreted semantic. The suggest query service 138 can provide the human readable format of the selected query suggestion to the user of interface 102. Then, if selected, a machine-readable form of a given query selection can be provided to the query engine 134. In other words, a user can select which of the selected query suggestions suits his or her needs and the suggest query service 138 can translate the selected suggestion(s) for use by the query engine 134 to execute a corresponding query.

The above process can be used to generate several consistent query suggestions that can be scored using a cumulative search score for each individual item, where the cumulative search score can be based on rules (such as described herein), the dataset statistics 127 and/or the usage statistics 130.

The system 100 can provide the advantage of an easy to use full text search to generate consistent queries/query objects without user action. The queries may be expressive of data in repositories and include keyword and grammar support. In addition, the system 100 can provide the advantage of ranking such queries. The system 100 may also be fault tolerant with respect to typing and semantic errors. The system 100 may provide incremental learning for a user because the user can reuse keywords presented in previous query suggestions that the user received.

Figure 2:
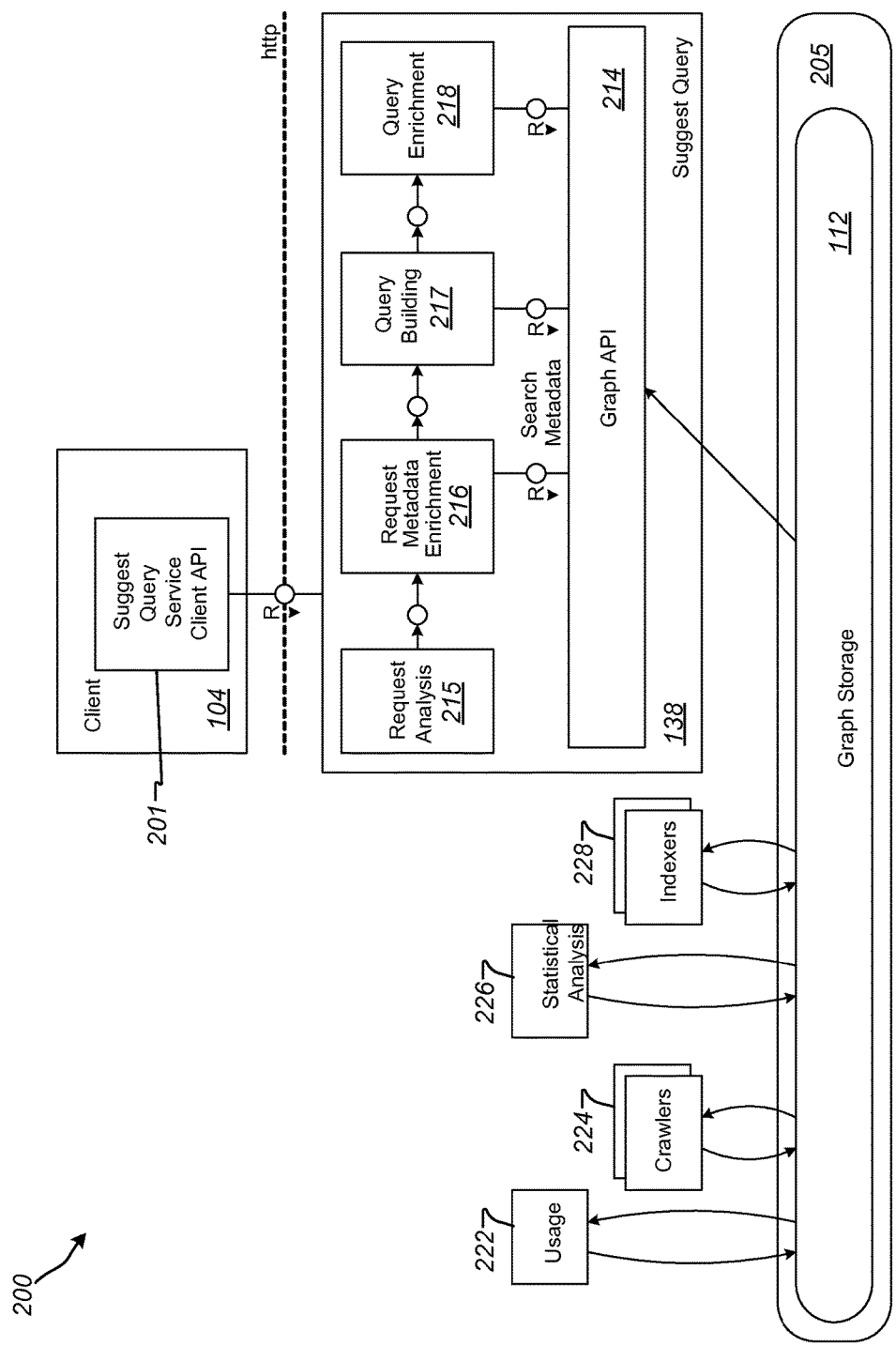
FIG. 2 is a block diagram illustrating an example query suggestion and completion system that can be implemented in the system of FIG. 1.

FIG. 2 is a block diagram illustrating an example query suggestion and completion system 200 that can be implemented in the system 100 of FIG. 1. Accordingly, for purposes of illustration, the system 200 is illustrated as including elements of the system 100, and FIG. 1 will be referenced, as appropriate, in the discussion of FIG. 2.

In an implementation, the system 200 can assist a user in composing (building) a query string to be executed on one or more dataset included in a database 205, where information about the datasets can be maintained in a knowledge graph, such as the knowledge graph 112 discussed above and shown, for purposes of illustration, in FIG. 2. In other implementations, the system 200 can be used to assist a user in building a query that is to be executed on datasets that are stored in a database system having a configuration other than those described herein. Briefly, the system 200 can be used to determine a current user-context (such as user-contexts as described herein), identify query parameters (e.g., measures, dimensions and/or filters) related to that user-context, provide suggestions for building a query that are consistent (e.g., as determined using the scoring techniques described herein) with the user-context and provide suggested related data visualizations based on the user-context and an executed and/or edited query.

As shown in FIG. 2, the system 200 includes the client device 104, the suggest query service 138 and graph storage 212, which can be implemented as, at least a portion of, the knowledge graph 112 of the system 100. As illustrated in FIG. 2, graph storage 212 can be included in a database 205, which can take a number of forms, such as an in-memory database, a distributed database, or other database configuration. The client 104 in the system 200 includes a suggest query service client API 201, which can be configured to communicate with the suggest query service 138 to build a query string based on a current user-context and/or provide related visualization suggestions based on the current user-context. Likewise, the suggest query service 138 of FIG. 2 includes a graph API that can be configured to communicate with graph storage 212 to provide query suggestions and related visualization suggestions (e.g., in conjunction with the suggest query service client API 201).

In FIG. 2, the suggest query service 138 is illustrated as including a request analysis service 215, a request metadata enhancement service 216, a query building service 217 and a query enrichment service 218. The request analysis service 215 analyzes and tokenizes the textual user input, and associates some tokens to keywords if a matching textual query portion can be found in the grammar 122. The request metadata enhancement service 216 attempts to associate each token with a list of matching metadata 120 or data contained in index 128, using a suitable search engine. In some implementations, the matching can be performed using a Levenshtein distance algorithm to account for typing errors. Other approximating algorithms can, of course, be substituted. The query building service 217 combines the measures, dimensions and/or filter values determined by 216 into a plurality of query suggestions, and selects the most suitable suggestions, according to rules, usage statistics or data statistics. The query completion service 218 further enhances the suggestions created by service 217 by adding compatible measures, dimensions or filters that could be of interest given the user context, for further exploration of the dataset. In an implementation, the request analysis service 215, the request metadata enhancement service 216, the query building service 217 and the query enrichment service 218 can be used to implement the methods of FIGS. 3 and 5, which are discussed below. For instance, these elements of the query suggest service 138 can be configured to provide query suggestions and/or suggest related data visualizations, where those determinations can be based on the usage statistics 130 in combination with a current user-context. In such an approach, the usage statistics 130 can be used to compute numerical scores to rank the relevance of each of a plurality of query parameters that may be relevant to a user based on a current user-context.

In some implementations, suggestions (query completion and related visualization suggestions) can be also be based on other scores (e.g., other ranked numerical scores), such as rule-based scores and/or dataset statistic based scores, where such other scores can also be based on the current user-context. In such implementations, different (ranked) scores for a given set of possible suggestions can be merged (blended, combined, etc.) to produce a single set of ranked numerical scores for the given set of possible suggestions. The suggest query service 138 can then make suggestions to a user (e.g., on the user interface 102 of the client 104 via the suggest query service API 201) for building a query and/or for a data visualization that is (are) consistent with (relevant to) the current user context, where the suggestions are based on such ranked scores (usage based scores, or otherwise).

As shown in FIG. 2, the system 200 also includes a usage metrics service (usage) 222, a crawler service (crawlers) 224, a statistical analysis service 226 and an indexer service (indexers) 228. In the system 200, usage 222 can be configured to communicate with graph storage 212 to collect and maintain usage statistics (such as those described herein) for data that is included in a knowledge graph. The crawlers 224 can be configured to extract (determine, etc.) metadata from the datasets 114 and store them in the graph storage 212. Such metadata can include dimensions, measures and default aggregation functions corresponding with data stored in the datasets 114. The metadata generated by the crawlers 224 can then be stored in the graph storage 212. The statistical analysis service 226 can be configured to determine a set of statistics based on data included in datasets of the graph storage 212. Such statistics can include correlations (symmetric and asymmetric) between dimensions and/or measures, determinations of whether measures are "continuous" or "discrete", cardinality, minimums, medians, maximums, identification of Pareto distributions, etc. The indexers 228 can be configured to index different sets of values of dimensions for datasets of the graph storage 212, so that those dimension values can be quickly retrieved from the graph (e.g., for responding to a query and/or for providing a query suggestion).

Figure 3:
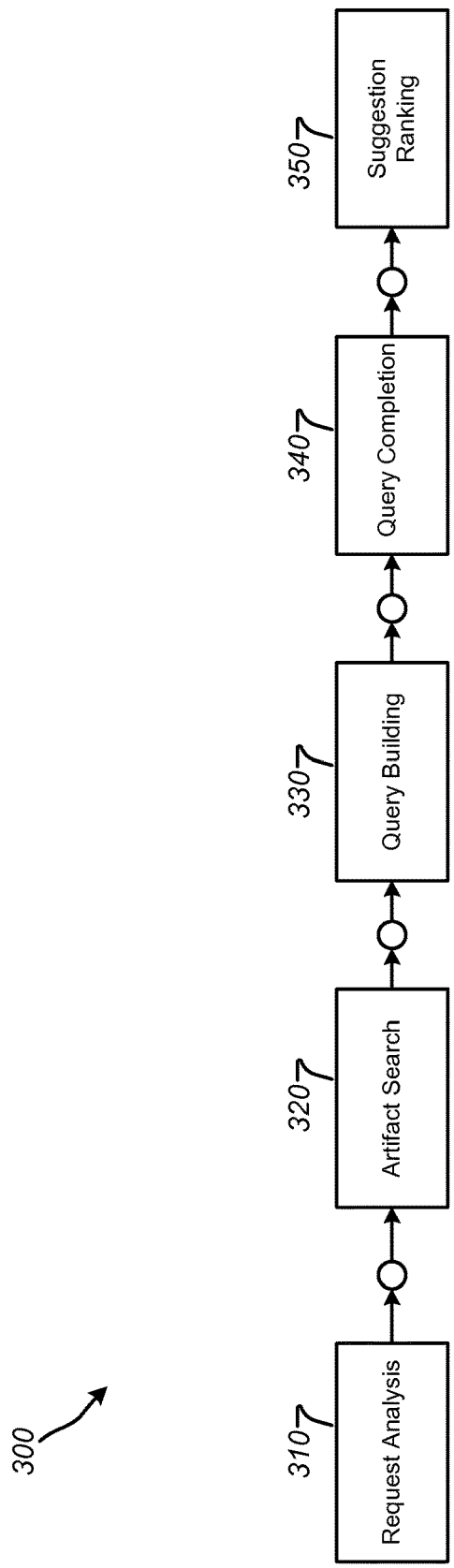
FIG. 3 is a flowchart illustrating an example method for query suggestion and completion.

FIG. 3 is a flowchart illustrating an example method 300 for query suggestion and completion. The method 300 can be implemented in the systems 100 and 200 of FIGS. 1 and 2. Accordingly, for purposes of illustration, the method 300 will be described with further reference to FIGS. 1 and 2, as appropriate. It will be appreciated, however, that the method 300 can be implemented in systems having other configurations than those shown in FIGS. 1 and 2.

As illustrated in FIG. 3, the method 300 can include, at block 310, a request analysis. The request analysis at block 310 can be triggered by a given user accessing (logging into) the enterprise software application 106 (e.g., via the user interface 102) and entering textual input of at least a portion of a question (query) about datasets included in or represented by the graph storage 212 (the knowledge graph 112). During the request analysis at block 310, the query suggest service can determine a current user-context, such as determining a user identifier (user ID), the user's job function, business groups and/or hierarchies the user is associated with and/or the textual input received from the user. In addition, the request analysis at block 310 analyses the text entered by the user, splits it into tokens and recognizes grammar keywords.

At block 320, an artifact search is performed in response to the request analysis. The artifact search at block 320 can include using the index 128 to determine for each token from the textual input of the users a number of measures, dimensions and/or filter values whose names or descriptions match perfectly or partially the token. At block 330, the method 300 includes a query building process. The query building process can include combining the measures, dimensions and/or filter values determined by block 320 into a plurality of query suggestions. At block 340, the method 300 includes a query completion process. The query completion process at block 340 can include adding other measures, dimensions and/or filter values to the query suggestions provided at block 330 to make sure that they can be turned into executable queries. These additions can be determined by following some of the association rules 124. They can also be determined using information provided by the statistical analysis service 226, and/or using usage statistics 130. They can also be determined thanks to the user context and/or previously executed or edited queries in the system 200 (such as previous queries associated with the current user or other users the current user is connected with based on the determined user context). At block 350, the method 300 includes a suggestion ranking process. The suggestion ranking process at block 350 can include associating with each completed query a numeric score and ordering the completed queries according to their scores.

Figure 4B:
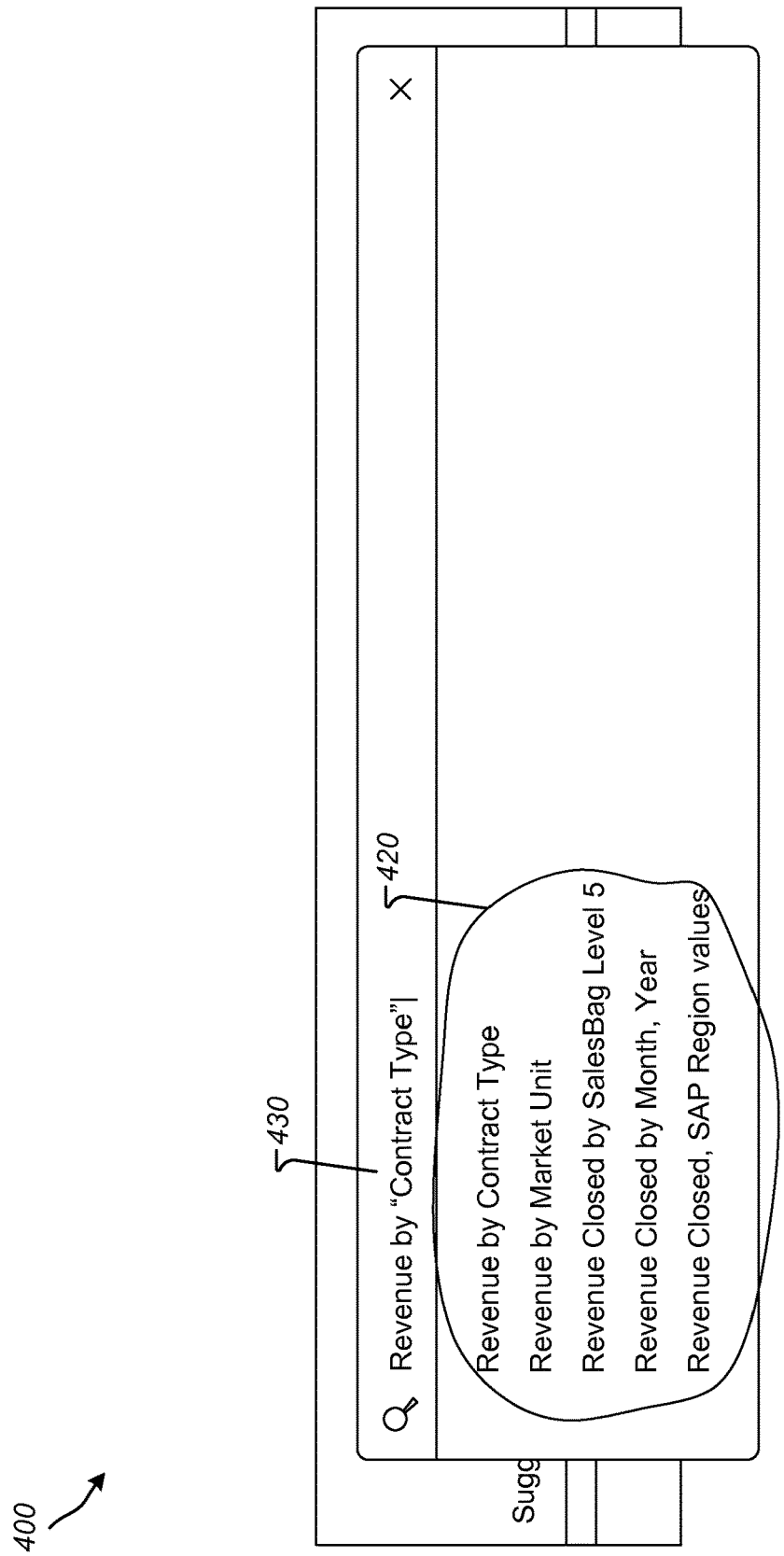

FIGS. 4A and 4B are screenshots of a user interface 400 illustrating an example process of using query suggestions for query completion. The user interface 400 can implement query completion suggestions that are made using the method 300, such as when implemented by the systems 100 and/or 200. Accordingly, for purposes of illustration, the user interface in FIGS. 4A and 4B will be described with further reference to FIGS. 1-3, as appropriate. It will be appreciated, however, that the user interface 400 can be implemented in systems having other configurations than those shown in FIGS. 1 and 2 and/or using query completion and suggestion methods other than the method 300.

Referring to FIG. 4A, the user interface 400 is illustrated showing that a current user has entered the query terms (parameters, etc.) "Revenue by" as query string 410 (e.g., a dimension parameter with an expected measure to follow). Using the approaches described herein, the suggest query service 138 can generate query suggestions 420 based on a current user-context, including the entered query string 410, usage metrics, dataset statistics and/or rules, such as those described herein. For instance, the suggest query service 138 may determine measures, other dimensions and/or filters that are considered relevant to the query string 410 based on the current user-context and scores (e.g., usage metric scores, dataset statistics scores and/or rule-based scores) for query parameters that are identified as being related to the query string 410 by, for example, an artifact search at block 310 of the method 300. The ranked suggestions, such as those produced at block 350 of the method 500 can then be displayed to a user (e.g., in the user interface 102 of the client 104) as query completion suggestions 420.

Referring to FIG. 4B, the user interface 400 is illustrated after selection (e.g., by the current user) of a suggestion from the query completion suggestions 420. Specifically, in FIG. 4B, the query string 410 of FIG. 4B has been modified to query string 430 to include the selected suggested measure of "Contract Type" for a query string 430 of "Revenue by 'Contract Type.'" In the query string 430, the selected measure may be displayed in quotes to illustrate that "Contract Type" was selected from the query completion suggestions 420 made by the suggest query service 138. While not shown in FIG. 4B, in some implementations, the query completion suggestions 420, after selection of the measure "Contract Type", can be modified based on the addition of the selected measure to the current user-context.

Figure 5:
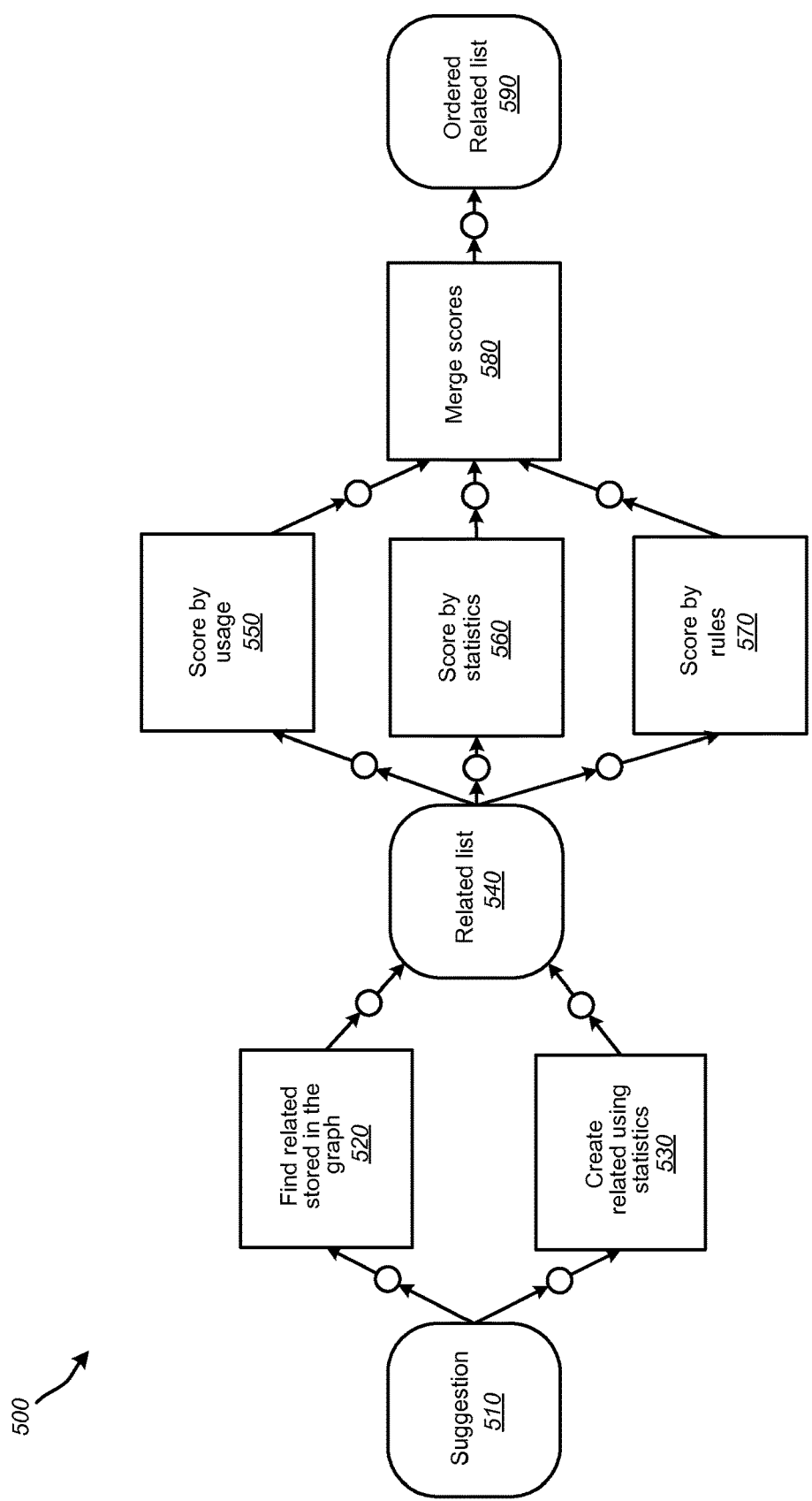
FIG. 5 is a flowchart illustrating an example method for suggesting data visualizations based on a user query.

FIG. 5 is a flowchart illustrating an example method 500 for suggesting data visualizations based on a user query string (e.g., user entered and/or completed using query suggestions). As with the method 300 of FIG. 3, the method 300 can be implemented in the systems 100 and 200 of FIGS. 1 and 2. Accordingly, for purposes of illustration, the method 500 will be described with further reference to FIGS. 1 and 2, as appropriate. It will be appreciated, however, that the method 500 can be implemented in systems having other configurations than those shown in FIGS. 1 and 2.

The method 500, at block 510, includes a user entering a query string and the suggest query service 138 generating a list of query suggestions, such as using the approaches described herein. In response to the entry of a query string and generation of query suggestions at block 510, the method 500 can include, at block 520, finding related query suggestions that are stored in graph storage 212 using the approaches described herein. Also in response to the entry of a query string and generation of query suggestions at block 510, the method 500 can include, at block 530 and in parallel with block 520, finding related query suggestions using statistics, such as a usage metrics and/or dataset statistics. At block 540, the related query suggestions found at block 520 and block 530 can be combined into a single related query suggestions list. At blocks 550, 560 and 570, the query suggestions of the related list of block 540 can be scored based on the current-user context and, respectively, usage metrics (block 550), dataset statistics (block 560) and/or rules (block 570). At block 580, the scores for the list of related query suggestions of block 540 from blocks 550, 560 and 570 can be merged into respective aggregate scores for each of the related query suggestions. At block 590, the list of related query suggestions can be ordered based on the respective aggregate scores. Visualizations of the related suggestions can then be presented to a user based on the ordered list of block 590.

Figure 6:
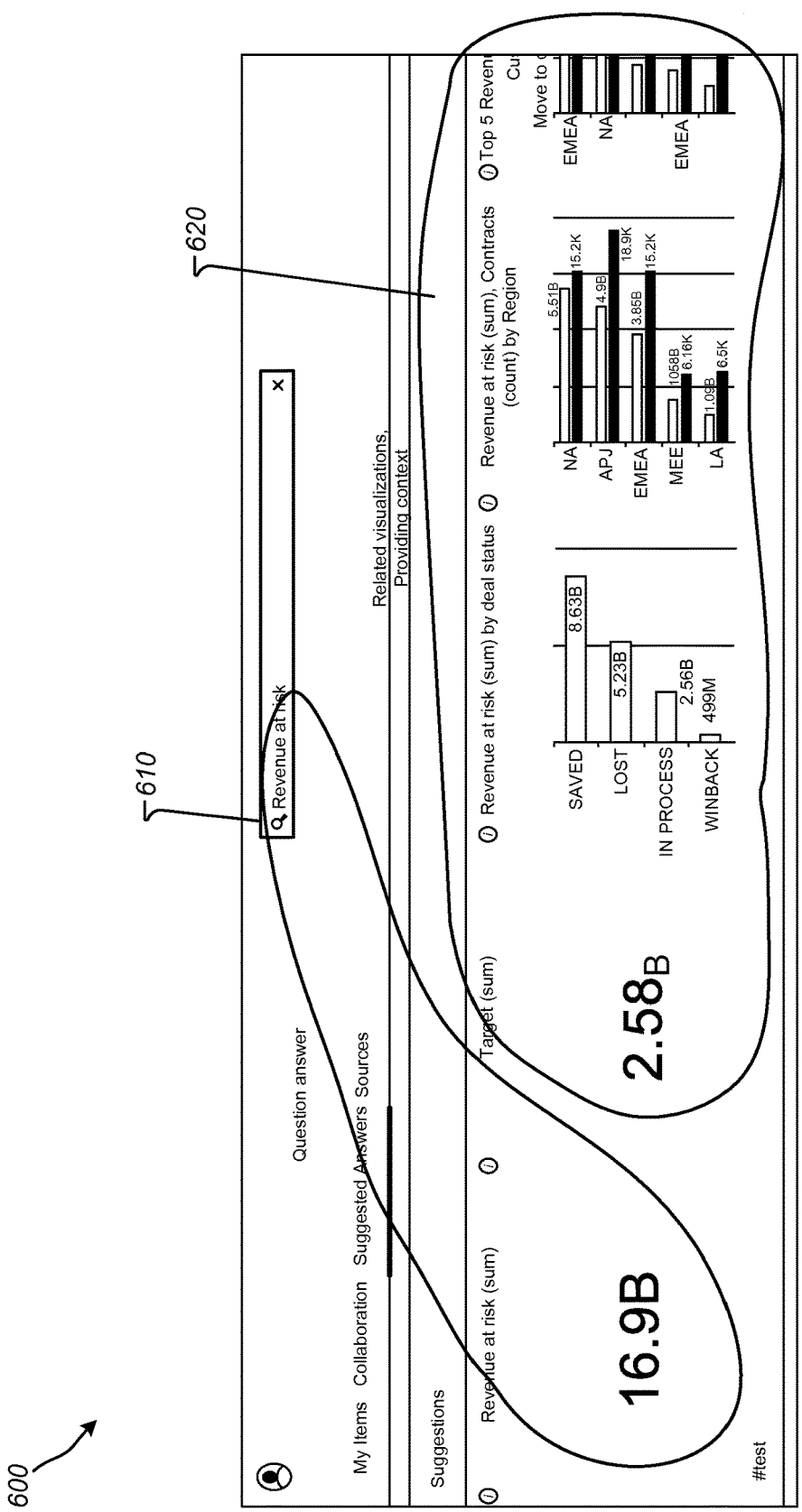
FIG. 6 is a screenshot illustrating suggested data visualizations based on a user query.

FIG. 6 is a screenshot of a user interface 600 illustrating suggested data visualizations based on a user query and current user-context. The suggested data visualizations provided in the user interface 600 can be provided, for example, based on an ordered, scored list of related query suggestions produced using the method 500. As illustrated in highlight 610 in FIG. 6, a user may enter a query string of Revenue at Risk and a direct answer to that query string (a sum of 16.9B) can be shown in the user interface 600. Further, in the highlight 620 in FIG. 6, various visualizations of the related suggestions (e.g., relevant to the current user-context, including the entered query string) may be presented. In this example, a target value (sum) for Revenue at Risk of 2.58B, a graph of Revenue at Risk by Deal Status and a graph of Revenue at Risk and Contracts by Region are shown. These related visualizations may be presented based on an ordered list of related suggestions, such as a list produced at block 590 of the method 500. In an implementation, a user can select one of the presented related visualizations to get more information on that view of data from one or more datasets corresponding with graph storage 212.

Figure 7:
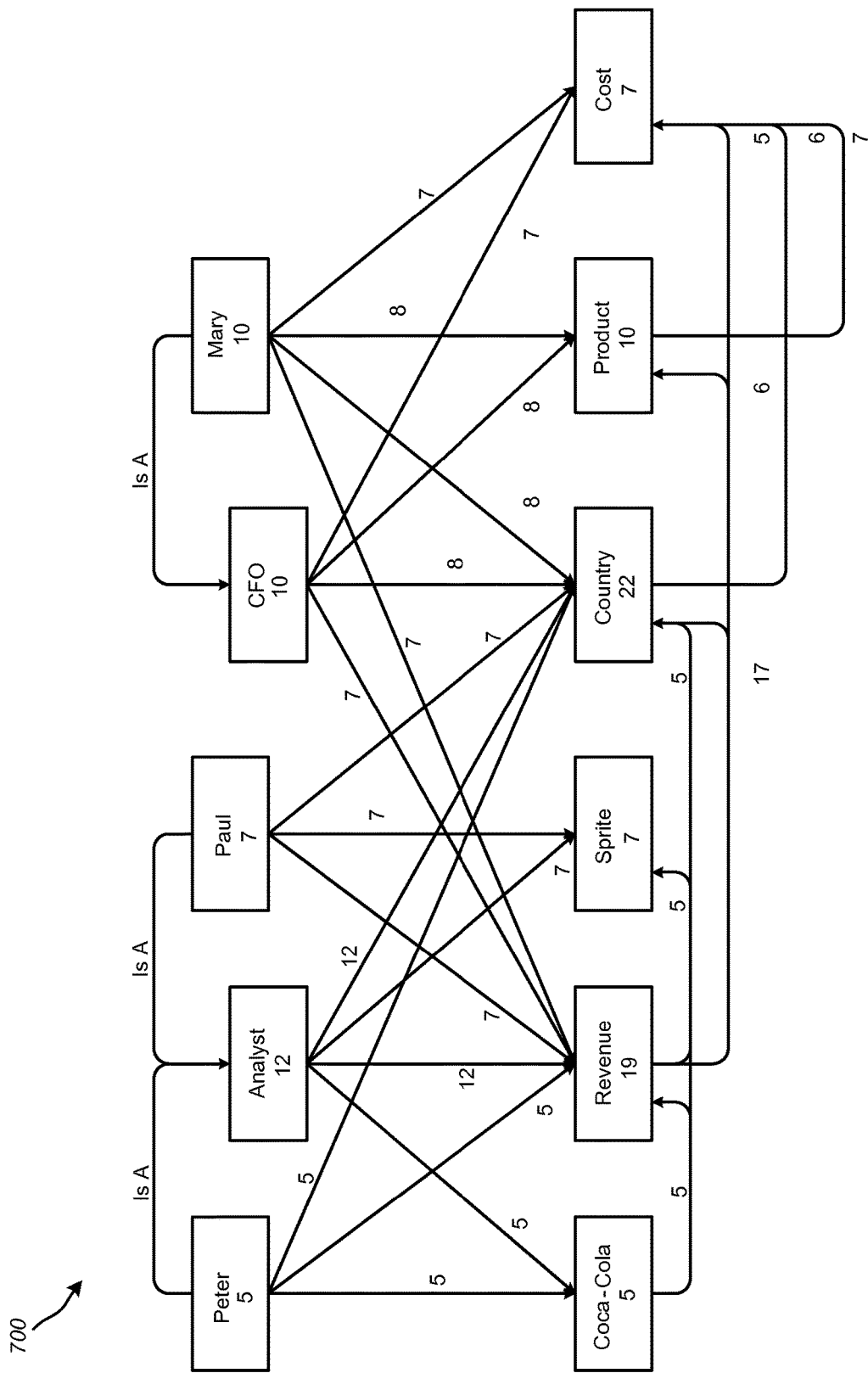
FIG. 7 is graph illustrating example usage statistics that can be used to provide contextualized suggestions for query completion and data visualizations.

FIG. 7 is graph 700 illustrating example usage statistics (usage metrics) that can be used to provide contextualized suggestions for query completion and presenting suggested related data visualizations. The usage metrics of the graph 700 can be stored, for example, in a knowledge graph (such as the knowledge graph 112 in FIG. 1), or in a database table that is external to the knowledge graph. The usage metrics of the graph 700 (or other usage metrics) can be used to provide contextualized query and related data visualization suggestions using the approaches described, such as in conjunction with the methods 300 and 500 (e.g., in the systems 100 and 200). For purposes of illustration, the graph 700 will be described with reference to the other drawings, as appropriate, though such usage metrics can be used in conjunction with systems and methods having other arrangements.

As shown in FIG. 7, the graph 700 includes a number of vertices and edges between those vertices, where usage metrics are associated with each of the vertices and edges. In an implementation, the graph 700 may be used to store usage metrics for a given business organization. The graph 700 can also include hierarchical relationships between vertices of the usage metrics. As some examples, the graph 700 includes vertices for employees Peter, Paul and Mary. Peter and Paul are hierarchically related with the vertex Analyst (e.g., their job role), while Mary is related to the vertex of CFO as her job role.

In the graph 700, the respective usage metrics for each of the vertices can represent the number of times the vertices are associated with a query performed by the system 100. For instance, the vertex for Peter has a usage metric of five, which can indicate that Peter has executed five queries. As can also be seen in FIG. 7, the vertex for Analyst has a usage metric of 12, which is the sum of the usage metrics for Peter and Paul, the two employees that are hierarchically related with the Analyst vertex. Further, the edge between the vertex for Peter and the vertex for Coca-Cola has a usage metric of five, which indicates that all five of the queries executed by Peter have included the query term (parameter) Coca-Cola. Accordingly, edge usage metrics can be used to indicate the number of times both vertices of a given pair are associated with a query. Further, edges and vertices that do not have a usage metric value (e.g., have a usage metric value of 0) can indicate that those edges or vertices have not been previously associated with a query (e.g., a query executed by the system 100).

As described herein, such usage metrics (e.g., the usage metrics in the graph 700) can be used to provide contextualized query suggestion and/or to present related data visualizations that are relevant to a current user context. As an example, Mary (the CFO) may access the enterprise software application 106 on the client 104 and provide textual input via the user interface 102 of "Product" (e.g., a dataset dimension) as the beginning of a question (query string). Using the method 300 of the method 500, it can be determined that the query parameter of "Product" is a dimension, and that a measure related to "Product" should be suggested (e.g., as part of the query building process at block 330). In this example, it may be determined that the measures "Revenue" and "Cost" are related to the dimension "Product."

The usage metrics in the graph 700 can then be used to compute numerical scores for Revenue and Cost within the current user-context (e.g., Mary, the CFO has entered a query parameter of Product). In this example, the numerical score for the Revenue measure may be calculated based on the usage metrics for: the Revenue vertex; the edge between Mary and Revenue; the edge between CFO and Revenue, and the edge between Product and Revenue. Likewise, the numerical score for the Cost measure can be calculated based on the usage metrics for: the Cost vertex, the edge between Mary and Cost, the edge between CFO and Cost; and the edge between Product and Cost.

Calculating numerical scores can be done in any number of appropriate fashions and the particular approach used will depend on the specific implementation. For example, numerical scores for query parameters that are determined as being related to an entered query string within a current user-context can be determined using conditional probabilities. In other implementations, such numerical scores can be determined using normalized averages of the usage statistics, where the numerical scores are normalized to values between zero and one. In such an approach, scores at or near 0.5 can be considered to be "average" candidates in combination with the entered query string in the current user-context, scores between 0 and 0.5 can be considered to be "below average" candidates and scores between 0.5 and 1 can be considered to be "above average" candidates. In such an approach, the lower the normalized numerical score, the less relevant the associated related query parameter is considered to be, while the higher the normalized numerical score, the more relevant the associated related query parameter is considered to be. In this example, using either method to compute numerical scores, Cost would be ranked above Revenue in an ordered list of related query parameters (e.g., such as a list generated at block 590 of the method 500), indicating Cost is more relevant measure (than Revenue) to Mary, the CFO, based on a question (query) regarding the data dimension Product.

Figure 8A:
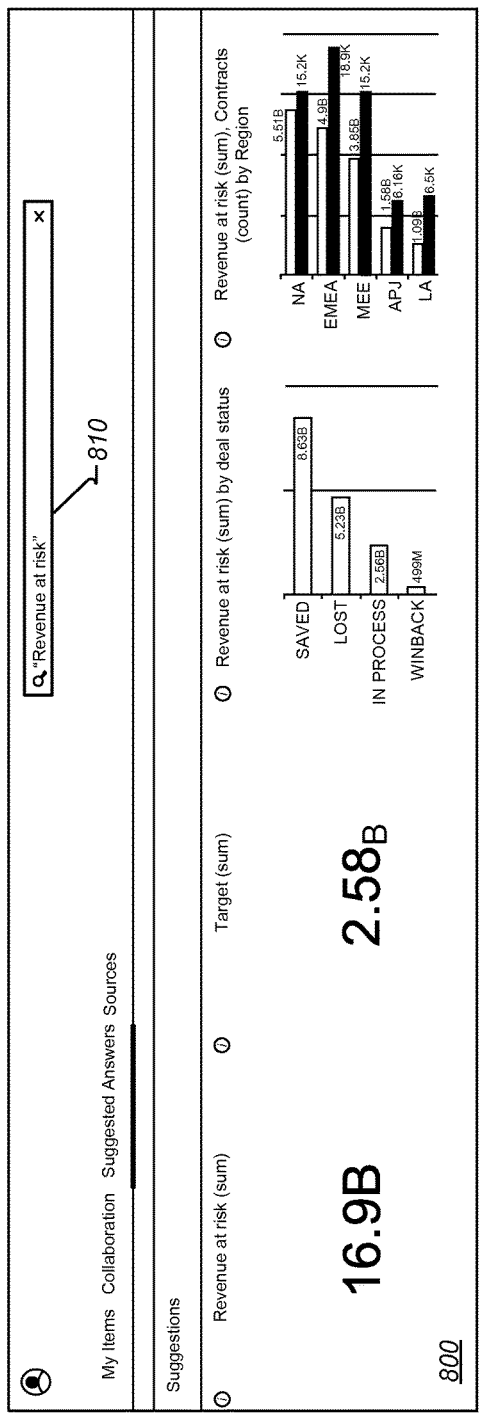
FIGS. 8A and 8B are screenshots illustrating an example of modifying data visualizations in response to selection of a query suggestion.
Figure 8B:
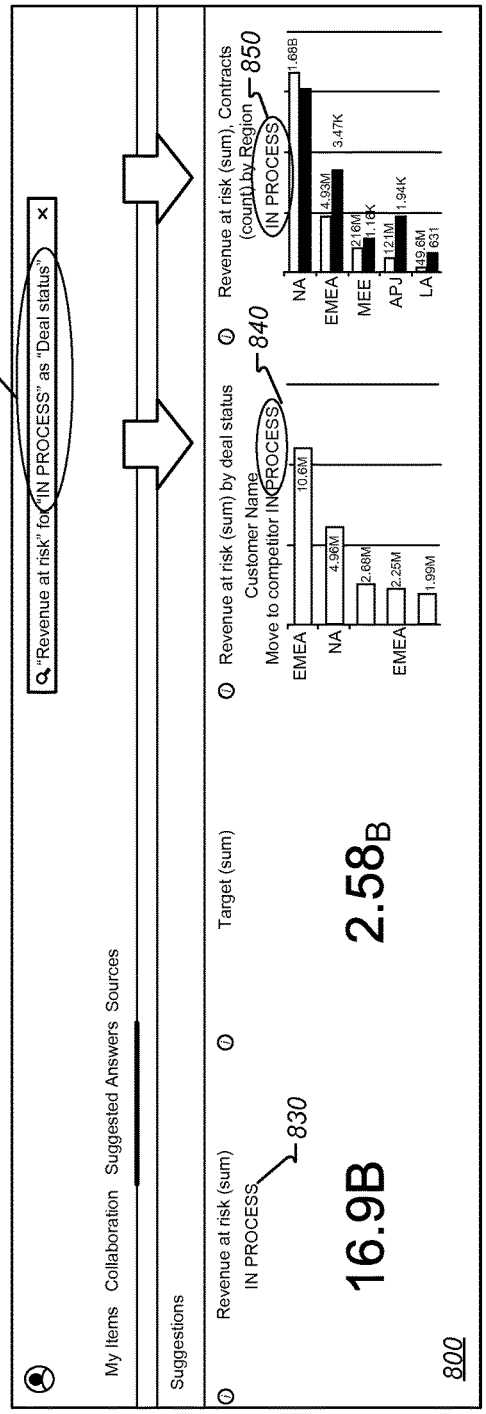

FIGS. 8A and 8B are screenshots of a user interface 800 illustrating an example of modifying data visualizations in response to the selection of a query suggestion. As shown in FIG. 8A, a query string 810 of "Revenue at risk" has been entered, and data visualizations (e.g., direct response and related visualizations) for the query string 810 (e.g., within an associate user-context) are shown. In this example, the user interface 800, the query string 810 and the corresponding data visualizations are the same as shown for the user interface 600 in FIG. 6.

In the illustration of the user interface 800 in FIG. 8B, a user has selected a data filter (e.g., from an ordered list of query suggestions) of "IN PROCESS as Deal status." In response to this selection, the suggest query service 138 (in conjunction with the enterprise software application) can present modified (e.g., query fit) data visualizations by applying the selected filter to the data visualizations of FIG. 8A where appropriate. For instance, the data visualization 830 is a sum of Revenue at risk with IN PROCESS as a Deal status. Similarly, the selected filter has been applied in the data visualizations 840 and 850 (as well as other changes to those suggested visualizations based on the change in the current user-context affected by selection of the data filter).

Figure 9:
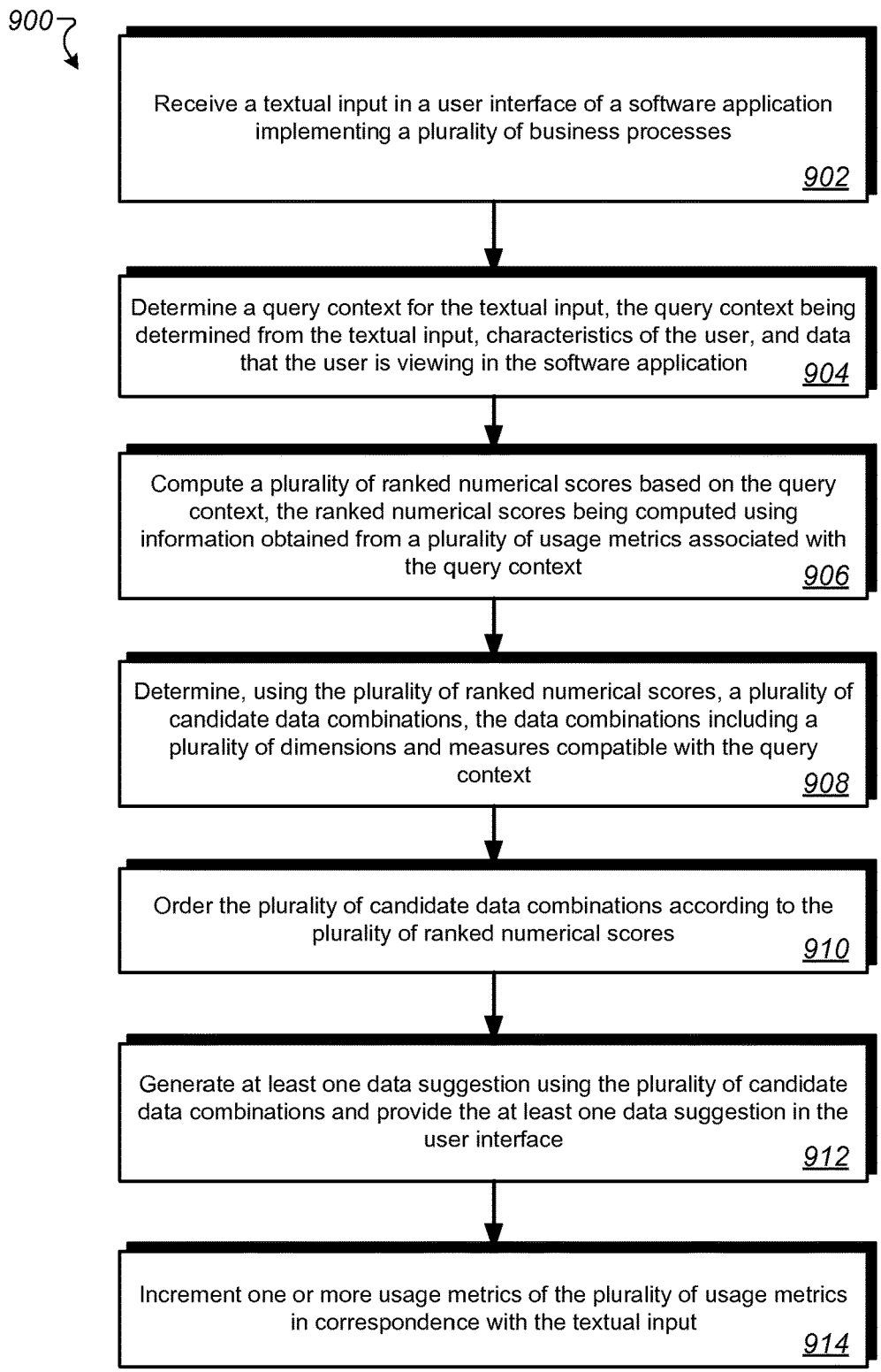
FIG. 9 is a flowchart illustrating a method 900 for providing query suggestions and recommended data visualizations, according to an implementation.

FIG. 9 is a flowchart illustrating a method 900 for providing query suggestions and recommended data visualizations, according to an implementation. The method 900 can be implemented using the systems and approaches described herein. Accordingly, the method 900 will be described with reference to the other figures of the disclosure, as appropriate. It will be appreciated, however, that the method 900 can be implemented in systems having other configurations and using other approaches that those described herein.

At block 902, the method 900 includes receiving, e.g., from a user, a textual input in a user interface of a software application implementing a plurality of business processes. The user interface can be the user interface 102 of the client 104 and the software application can be the enterprise software application 106, as shown in FIGS. 1 and 2. At block 904, the method 900 includes determining a query context for the textual input, the query context being determined from the textual input, characteristics of the user, and data that the user is viewing in the software application 106. Determining a query context associated with the user and data that the user is viewing in the software application can include accessing a profile of the user; extracting information from the profile of the user; selecting a subset of the plurality of usage metrics based on the extracted information, and calculating the ranked numerical scores using the subset of usage metrics.

At block 906, the method 900 can include computing a plurality of ranked numerical scores based on the query context. The ranked numerical scores can be computed using information obtained from a plurality of usage metrics associated with the query context. In the method 900, a usage metric of the plurality of usage metrics can be a weighted usage metric, where a weighting of the weighted usage metric corresponds with the user. Further, in the method 900, a usage metric of the plurality of usage metrics can be attributable to a plurality of users. The plurality of usage metrics can include a plurality of element (vertex) usage metrics and at least one element pair (edge) usage metric. Further in the method 900, a value of one or more usage metrics of the plurality of usage metrics can be exponentially decreased over time, so as to time limit the contribution (influence) of usage metrics on associated numerical scores determined at block 908.

At block 908, the method 900 includes determining, using the plurality of ranked numerical scores, a plurality of candidate data combinations, the data combinations including a plurality of dimensions and measures compatible with the query context. In an implementation, the plurality of ranked numerical scores of block 908 can include a plurality of conditional probabilities. In another implementation, the plurality of ranked numerical scores can include a plurality of weighted averages. Determining the plurality of candidate data combinations can include modifying the query context by performing actions using a dataset associated with the query context, the actions selected from the group consisting of substituting one dimension for another dimension, adding a dimension, adding a measure, and adding a filter.

At block 910, the method 900 includes ordering the plurality of candidate data combinations according to the plurality of ranked numerical scores. The plurality of ordered and ranked numerical scores can be used to recommend one or more graphic data visualizations corresponding to the at least one data suggestion.

At block 912, the method 900 includes generating at least one data suggestion using the plurality of candidate data combinations and providing the at least one data suggestion in the user interface. At block 914, the method 900 includes incrementing one or more usage metrics of the plurality of usage metrics in correspondence with the textual input.

Incrementing the one or more usage metrics includes incrementing one or more usage statistics using a weight corresponding with the user.

According to one general aspect, a computer-implemented method for generating a plurality of data query suggestions is described. The method includes receiving, from a user, a textual input in a user interface of a software application implementing a plurality of business processes and determining a query context for the textual input. The query context may be determined from the textual input, characteristics of the user, and data that the user is viewing in the software application. The method also includes computing a plurality of ranked numerical scores based on the query context in which the ranked numerical scores are computed using information obtained from a plurality of usage metrics associated with the query context. The method additionally includes determining, using the plurality of ranked numerical scores, a plurality of candidate data combinations. The data combinations include a plurality of dimensions and measures compatible with the query context. The method also includes ordering the plurality of candidate data combinations according to the plurality of ranked numerical scores and generating at least one data suggestion using the ordered plurality of candidate data combinations and providing the at least one data suggestion in the user interface.

One or more implementations may include the following features. For example, determining the plurality of candidate data combinations includes modifying the query context by performing actions using a dataset associated with the query context, the actions selected from the group consisting of substituting one dimension for another dimension, adding a dimension, adding a measure, and adding a filter. As another example, the plurality of ranked numerical scores are used to recommend one or more graphic data visualizations corresponding to the at least one data suggestion.

One or more implementations may include determining a query context associated with the user and data that the user is viewing in the software application. The determining includes accessing a profile of the user, extracting information from the profile of the user, selecting a subset of the plurality of usage metrics based on the extracted information, and calculating the ranked numerical scores using the subset of usage metrics.

One or more implementations may include the following features. A usage metric of the plurality of usage metrics is a weighted usage metric and a weighting of the weighted usage metric corresponds with the user. In some implementations, a usage metric of the plurality of usage metrics is attributable to a plurality of users. In some implementations, the plurality of usage metrics includes a plurality of element usage metrics and at least one element pair usage metric. In some examples, a value of a usage metric of the plurality of usage metrics is exponentially decreased over time.

In some implementations, the method further includes incrementing one or more usage metrics of the plurality of usage metrics in correspondence with the textual input. Incrementing one or more usage metrics includes incrementing one or more usage statistics using a weight corresponding with the user. In some implementations, the plurality of ranked numerical scores include a plurality of conditional probabilities. In one example, the plurality of ranked numerical scores include a plurality of normalized averages.

According to another general aspect, a system for building a query for execution on one or more datasets included in a database includes a client computing device implementing a user interface of a software application implementing a plurality of business processes, the user interface being configured to receive, from a user, a textual input and a suggest query service. The suggestion query service is configured to determine a query context for the textual input, the query context being determined from the textual input, characteristics of the user, and data that the user is viewing in the software application, compute a plurality of ranked numerical scores based on the query context, the ranked numerical scores being computed using information obtained from a plurality of usage metrics associated with the query context, determine, using the plurality of ranked numerical scores, a plurality of candidate query suggestions, the query suggestions including a plurality of dimensions and measures compatible with the query context, order the plurality of candidate query suggestions according to the plurality of ranked numerical scores, and generate at least one query suggestion using the ordered plurality of candidate query suggestions and providing the at least one query suggestion in the user interface.

One or more implementations may include the following features. The suggest query service is included in an enterprise software application and is further configured to increment one or more usage metrics of the plurality of usage metrics in correspondence with the textual input. In some implementations, determining a query context associated with the user and data that the user is viewing in the software application includes accessing a profile of the user, extracting information from the profile of the user, selecting a subset of the plurality of usage metrics based on the extracted information, and calculating the ranked numerical scores using the subset of usage metrics.

According to another general aspect, a computer program product may be tangibly embodied on a computer-readable medium and may include executable code that, when executed, is configured to cause at least one data processing apparatus to perform the following operations. Specifically, the executable code may cause receiving, from a user, a textual input in a user interface of a software application implementing a plurality of business processes and determining a query context for the textual input. The query context may be determined from the textual input, characteristics of the user, and data that the user is viewing in the software application. The executable code also computes a plurality of ranked numerical scores based on the query context in which the ranked numerical scores are computed using information obtained from a plurality of usage metrics associated with the query context. The executable code also additionally determines, using the plurality of ranked numerical scores, a plurality of candidate data combinations. The data combinations include a plurality of dimensions and measures compatible with the query context. The executable code also orders the plurality of candidate data combinations according to the plurality of ranked numerical scores and generating at least one data suggestion using the ordered plurality of candidate data combinations and providing the at least one data suggestion in the user interface.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for generating at least one query suggestion, the method comprising:
   receiving, at an online analytical processing system including a database system, a textual input from a user interface of a software application implementing a plurality of business processes;
   determining a query context for the textual input, the query context being determined from the textual input, characteristics of a user, and data being displayed at the user interface, the query context enabling identification of at least one measure, at least one dimension, and/or at least one filter associated with at least one data set being searched via the online analytical processing system including the database system;
   computing, based on the query context, a plurality of ranked numerical scores, each of the ranked numerical scores determined based on a combination of a first score, a second score, and a third score, the first score being computed based on usage metrics representative of usage by a user of the at least one data set, the second score being computed based on data set statistics representative of statistics about the at least one data set, and the third score being computed based on rules associated with the query context including at least one rule regarding the characteristics of the user and at least one association rule defining how elements of a query are combined;
   determining, using the plurality of ranked numerical scores, a plurality of candidate query suggestions, wherein the determining of the plurality of candidate query suggestions includes modifying the query context by at least modifying the at least one measure, the at least one dimension, and/or the at least one filter;
   ordering the plurality of candidate query suggestions according to the plurality of ranked numerical scores;
   generating at least one query suggestion from the ordered plurality of candidate query suggestions; and
   causing the at least one query suggestion to be displayed at the user interface.

2. The computer-implemented method of claim 1, wherein the modifying includes substituting one dimension for another dimension, adding a dimension, adding a measure, adding a filter, or a combination thereof.

3. The computer-implemented method of claim 1, wherein the plurality of ranked numerical scores are used to recommend one or more graphic data visualizations corresponding to the at least one query suggestion.

4. The computer-implemented method of claim 1, wherein determining a query context associated with the user and data being displayed on the user interface includes:
   accessing a profile of the user;
   extracting information from the profile of the user;
   selecting a subset of the usage metrics based on the extracted information; and
   calculating the ranked numerical scores using the subset of usage metrics.

5. The computer-implemented method of claim 1, wherein a usage metric of the usage metrics is a weighted usage metric, and wherein a weighting of the weighted usage metric corresponds with the user.

6. The computer-implemented method of claim 1, wherein a usage metric of the usage metrics is attributable to a plurality of users.

7. The computer-implemented method of claim 1, wherein the usage metrics includes:

element usage metrics; and
at least one element pair usage metric.

8. The computer-implemented method of claim 1, wherein a value of a usage metric of the usage metrics is exponentially decreased over time.

9. The computer-implemented method of claim 1, further comprising:
incrementing one or more usage metrics of the usage metrics in correspondence with the textual input.

10. The computer-implemented method of claim 9, wherein incrementing one or more usage metrics includes incrementing one or more usage statistics using a weight corresponding with the user.

11. The computer-implemented method of claim 1, wherein the plurality of ranked numerical scores include a plurality of conditional probabilities.

12. The computer-implemented method of claim 1, wherein the plurality of ranked numerical scores include a plurality of normalized averages.

13. A system comprising:
a client computing device implementing a user interface of a software application implementing a plurality of business processes, the user interface being configured to receive, from a user, a textual input; and
an online analytical processing system including a database system configured to at least:
receive, from the user interface, the textual input;
determine a query context for the textual input, the query context being determined from the textual input, characteristics of the user, and data being displayed at the user interface, the query context enabling identification of at least one measure, at least one dimension, and/or at least one filter associated with at least one data set being searched via the online analytical processing system including the database system;
compute, based on the query context, a plurality of ranked numerical scores, each of the ranked numerical scores determined based on a combination of a first score, a second score, and a third score, the first score being computed based on usage metrics representative of usage by a user of the at least one data set, the second score being computed based on data set statistics representative of statistics about the at least one data set, and the third score being computed based on rules associated with the query context including at least one rule regarding the characteristics of the user and at least one association rule defining how elements of a query are combined;
determine, using the plurality of ranked numerical scores, a plurality of candidate query suggestions, wherein to determine the plurality of candidate query suggestions, the system is further configured to at least modify the query context by at least modifying the at least one measure, the at least one dimension, and/or the at least one filter;
order the plurality of candidate query suggestions according to the plurality of ranked numerical scores;
generate at least one query suggestion from the ordered plurality of candidate query suggestions; and
cause the at least one query suggestion to be displayed at the user interface.

14. The system of claim 13, wherein the database system is included in an enterprise software application.

15. The system of claim 13, wherein the database system is further configured to increment one or more usage metrics of the usage metrics in correspondence with the textual input.

16. The system of claim 13, wherein determining a query context associated with the user and data being displayed on the user interface includes:
accessing a profile of the user;
extracting information from the profile of the user;
selecting a subset of the usage metrics based on the extracted information; and
calculating the ranked numerical scores using the subset of usage metrics.

17. A non-transitory recordable storage medium including computer program instructions which, when executed by one or more processors, result in operations comprising at least:
receiving, at an online analytical processing system including a database system, a textual input from a user interface of a software application implementing a plurality of business processes;
determining a query context for the textual input, the query context being determined from the textual input, characteristics of a user, and data being displayed at the user interface, the query context enabling identification of at least one measure, at least one dimension, and/or at least one filter associated with at least one data set being searched via the online analytical processing system including the database system;
computing, based on the query context, a plurality of ranked numerical scores, each of the ranked numerical scores determined based on a combination of a first score, a second score, and a third score, the first score being computed based on usage metrics representative of usage by a user of the at least one data set, the second score being computed based on data set statistics representative of statistics about the at least one data set, and the third score being computed based on rules associated with the query context including at least one rule regarding the characteristics of the user and at least one association rule defining how elements of a query are combined;
determining, using the plurality of ranked numerical scores, a plurality of candidate query suggestions, wherein the determining of the plurality of candidate query suggestions includes modifying the query context by modifying the at least one measure, the at least one dimension, and/or the at least one filter;
ordering the plurality of candidate query suggestions according to the plurality of ranked numerical scores;
generating at least one query suggestion from the ordered plurality of candidate query suggestions; and
causing the at least one query suggestion to be displayed at the user interface.

18. The non-transitory recordable storage medium of claim 17, wherein the modifying includes substituting one dimension for another dimension, adding a dimension, adding a measure, adding a filter, or a combination thereof.

19. The non-transitory recordable storage medium of claim 17, wherein the instructions, when executed by the one or more processors, further result in incrementing one or more usage metrics of the usage metrics in correspondence with the textual input.

20. The non-transitory recordable storage medium of claim 17, wherein the instructions, when executed by the one or more processors, further result in a value of a usage metric of the usage metrics being exponentially decreased over time.

* * * * *